United States Patent Office 2,955,528
Patented Oct. 11, 1960

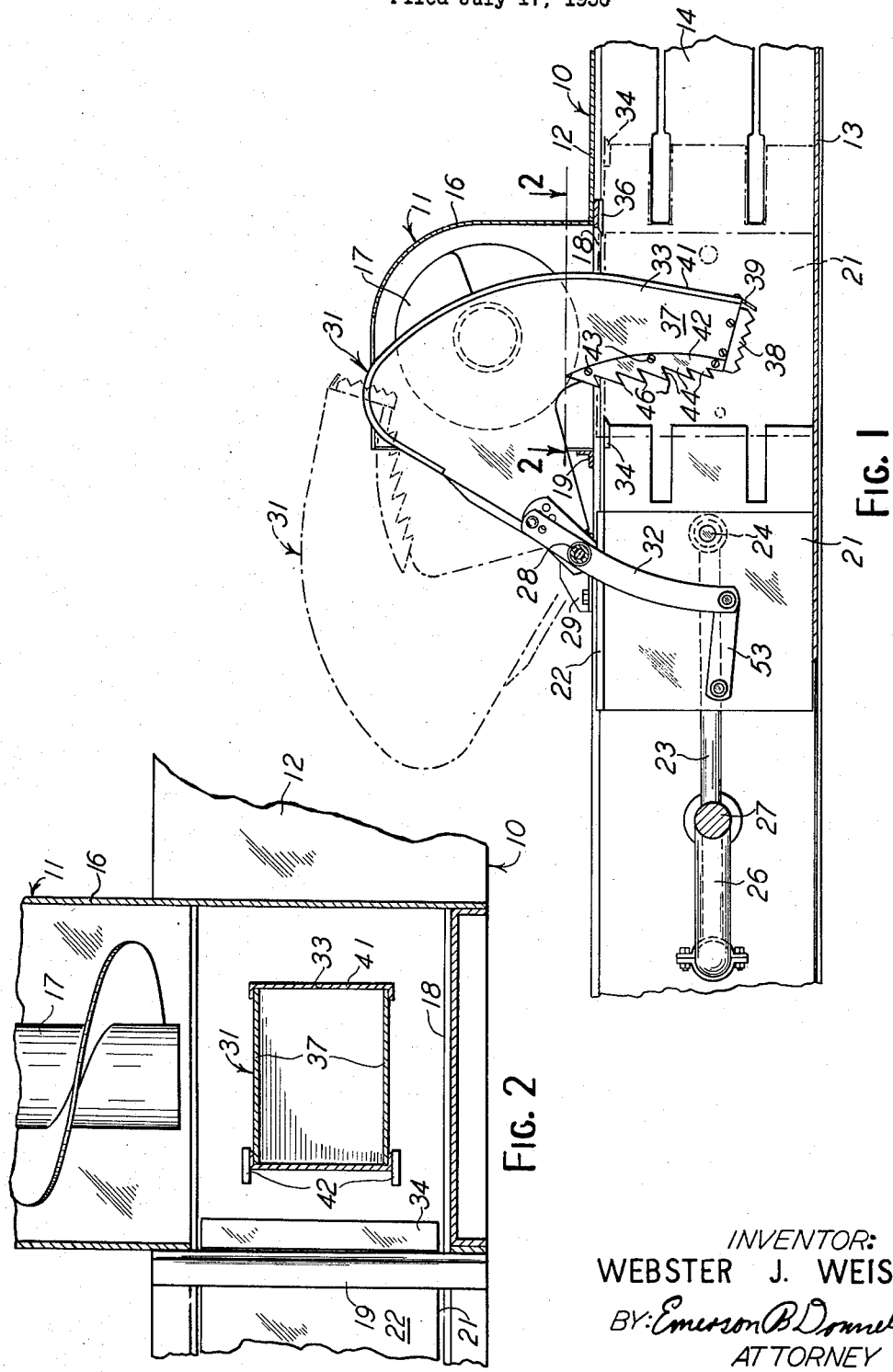

2,955,528
FEEDER HEAD FOR CROP BALER

Webster J. Weiss, Racine, Wis., assignor to J. I. Case Company, Racine, Wis., a corporation of Wisconsin Filed July 17, 1956, Ser. No. 598,349

3 Claims. (Cl. 100—142)

This invention relates to crop balers, and, more specifically, it relates to the feeder head for crop balers.

It is a general object of this invention to improve the conveyance of crops through the bale chamber inlet and into the bale chamber.

A more specific object of this invention is to provide means for use with feeder heads of an existing type wherein the crop movement is improved and the crop is better compressed in the bale chamber. The accomplishment of this two-fold object will result in faster and more efficient baling and it will permit cleaner slicing of the bale.

Still another object of this invention is to pack the bale uniformly throughout, and this accomplishes better preservation of the crop being baled.

Other objects and advantages, such as simplicity and inexpensiveness in the improved structure, will appear upon reading the following description in light of the accompanying drawings, wherein:

Fig. 1 is a fragmentary and partly sectioned side elevational view of a baler incorporating a preferred embodiment of this invention.

Fig. 2 is an enlarged sectional view of a fragment of Fig. 1 taken along the line 2—2 of Fig. 1.

Similar reference numerals refer to the same parts throughout the drawings and specification.

The drawings show a fragment of a baler for use on crops such as hay. The baler includes a bale case 10, which extends in the direction of travel of the baler, and a feeder unit 11, which extends transverse to the direction of travel. The bale case consists of top and bottom walls 12 and 13, respectively, and side walls 14, while the feeder unit 11 is shown to include a housing 16 with an auger conveyor 17 rotatably disposed therein. The bale case top wall 12 has an inlet or opening 18 aligned with the feeder unit so that, in a well-known manner, by rotation of the auger 17, crop material is fed along the housing 16 to the opening 18. An angle iron 19 is attached across the top of the case 10 and defines a margin of the opening 18.

The usual crop compressing plunger 21 is disposed within the bale case 10 which defines the bale chamber. The plunger includes a top 22, and one end of a pitman 23 is attached to a side of the plunger on a wrist pin 24 while the other end of the pitman is journaled on a crank 26 rotatable about the center section 27. With this customary arrangement, the plunger 21 is reciprocably driven in the bale case to move from its retracted full-line position to its extended dotted line position in response to rotation of the crank 26.

A rock shaft 28 is rotatably mounted on the bale case 10 by means of end brackets, such as the bracket 29 which is bolted to the bale case. An L-shaped feeder head 31 is mounted on the shaft 28 for rocking motion therewith in the usual manner. To effect the rocking motion, a lever 32 is mounted on the shaft 28 and it depends therefrom to a link 53 which connects to the plunger 21 and thereby transmits motion from the plunger to the lever 32 which rocks the shaft 28. One end of the feeder head is secured to the rock shaft to rock therewith, and, of course, the reciprocal and pivotal movement of the feeder head is synchronized with the reciprocal motion of the plunger 21. Here also, the feeder head is shown in an extended full-line position and a retracted dotted-line position. By virtue of the described connection between the plunger and the feeder head, the latter is pivoted into and out of the bale chamber with a relatively long pause or dwell at the end of its outward movement and a short pause or dwell at the end of its inward movement, as described in the patent to Brannstrom, 2,825,277, assigned to applicant's assignee, while the plunger's strokes are more uniform with equal dwell at the ends of the strokes.

The feeder head includes an end section 33 which is of a size suitable to pass through the opening 18, as shown in the full-line position. Also, the plunger 21 covers the opening 18 when the feeder head is withdrawn to the dotted-line position. It should also be noted that the top of the plunger has a knife 34 attached thereto while the bale case has a knife 36 attached to it. The two knives cooperate upon movement of the plunger 21 to cut any crop which is disposed between the knives, all in the usual manner.

Still another conventional part of the baler is that shown on the end of the feeder head where each of the two sides 37 of the feeder head has a saw tooth plate 38 attached thereto, and another saw tooth plate 39 is attached to the end 41 of the feeder head. These three plates engage the crop fed into the opening 18 and tend to hold it as the feeder head pivots downwardly in the bale chamber to place the crop therein. The important feature of this invention is the provision of saw tooth plates 42 attached to the sides 37 of the feeder head in the spaced apart positions shown. The plates 42 are also shown secured to the feeder head by bolts 43. The plates 42 are, therefore, disposed in the plane of pivotal movement of the feeder head, and the plate edge which is nearest the pivot point, which is determined by the rock shaft, is provided with a plurality of saw teeth or projections 44. The teeth 44 terminate in projecting points 46 which all lie on a straight line which is tangential to an arc formed by a point on the feeder head and which is upright in the full-line position of the feeder head. Also, the teeth 44 are inclined in the direction of compressing motion of the feeder head. As mentioned, teeth 44 are of the saw tooth type and this term means that each tooth has a substantial angle formed from its point 46 along the edges of the tooth.

With the provision of the saw tooth plates 42, there is achieved an improvement in depositing the crop in the chamber since the teeth 44 engage the crop in the pivotal path of the plates and push it down into the chamber. This action is, therefore, particularly useful in clearing the crop away from in front of the angle 19 and on top of the plunger 21 around the knife 34. Heretofore, this region of the path of crop movement to the chamber has not been cleared as well as it can now be cleared by the improved feeder head. Also, the bale is better compressed in the region where the plates 42 are effective toward the rear of the bale. The particular configuration and disposition of the teeth 46 cause the crop to be pressed downwardly in the bale chamber but the teeth are free to be retracted upwardly without carrying the crop up with them. In this manner, the teeth are withdrawn from the bale with a minimum of disturbance to the bale as the pivotal motion of the feeder head by virtue of the incline of the teeth withdraws the teeth substantially in the direction opposite the direction toward which the teeth are pointed.

While a specific embodiment of this invention has been

I claim:

1. In a baler of the type including a bale chamber and having a crop inlet opening at the top thereof, a crop compressing plunger disposed in said chamber for reciprocation therein across said opening and providing a cover to said opening when thereacross, means for continuously conveying crops toward said opening, and a feeder head pivotally mounted on said baler for reciprocation into and out of said chamber through said opening in alternating motion with the reciprocation of said plunger being across said opening whereby crops fed to said opening are pushed into said chamber by said feeder head and are moved along said chamber to the rear thereof by said plunger, in combination with the aforementioned parts, saw teeth attached to said feeder head and extending along the side thereof to project therefrom toward the front of said chamber for pushing said crops into said chamber upon pivotal movement of said feeder head into said chamber, said saw teeth being formed and disposed on said feeder head to position the projecting points of said saw teeth along a straight line disposed substantially vertical when said feeder head is moved to the end of its pivotal movement in said chamber.

2. In a feeder head for a baler of the type employed to bale crops wherein said feeder head is mounted on the bale case of said baler for pivotal movement of one end thereof into and out of the bale chamber defined by the bale case, two rows of pointed saw teeth attached to said one end of said feeder head in spaced-apart positions with the extending points of each of said rows of said teeth disposed on a straight line tangential to an arc of pivot of said feeder head and with said points of said teeth directed oblique to said line and toward said bale chamber and projecting away from said feeder head toward the axis of pivot.

3. In a feeder for a baler of the type having a reciprocating plunger, means for reciprocating the plunger, walls enclosing the plunger and forming a bale case, one of said walls having a feed opening traversed by the plunger so that said plunger will cross and close the opening in one position and will clear the opening in another position during its reciprocation, means for conveying entangled crop material to the region of the opening whereby material may accumulate about the edges of said opening; the combination of a rock shaft mounted on the wall of said bale case containing said opening and spaced therefrom, a substantially L shaped feeder head having a section of a size to enter said opening at times when said plunger is clear of said opening, and a portion journaled about said rock shaft and lying along said wall between said rock shaft and said opening when the first mentioned section is in said opening, so as to be encumbered by material accumulating between said rock shaft and said opening, means for rocking said feeder head, and a line of teeth disposed longitudinally along a side margin of said first-mentioned section and directed inwardly from said feeder head and toward said rock shaft and proportioned to enter said opening with said first mentioned section so as to engage accumulated entangled material and sweep it into said opening out of the path of the second mentioned section of said feeder head.

References Cited in the file of this patent

UNITED STATES PATENTS

| | | |
|---|---|---|
| 1,027,868 | Madsen | May 28, 1912 |
| 1,041,521 | Slover et al. | Oct. 15, 1912 |
| 1,213,551 | Southwick | Jan. 23, 1917 |
| 2,750,877 | Nolt | June 19, 1956 |
| 2,825,277 | Brannstrom et al. | Mar. 4, 1958 |